Feb. 8, 1927.
J. D. BERGER
1,616,647
GROUND VASE
Filed June 22, 1925
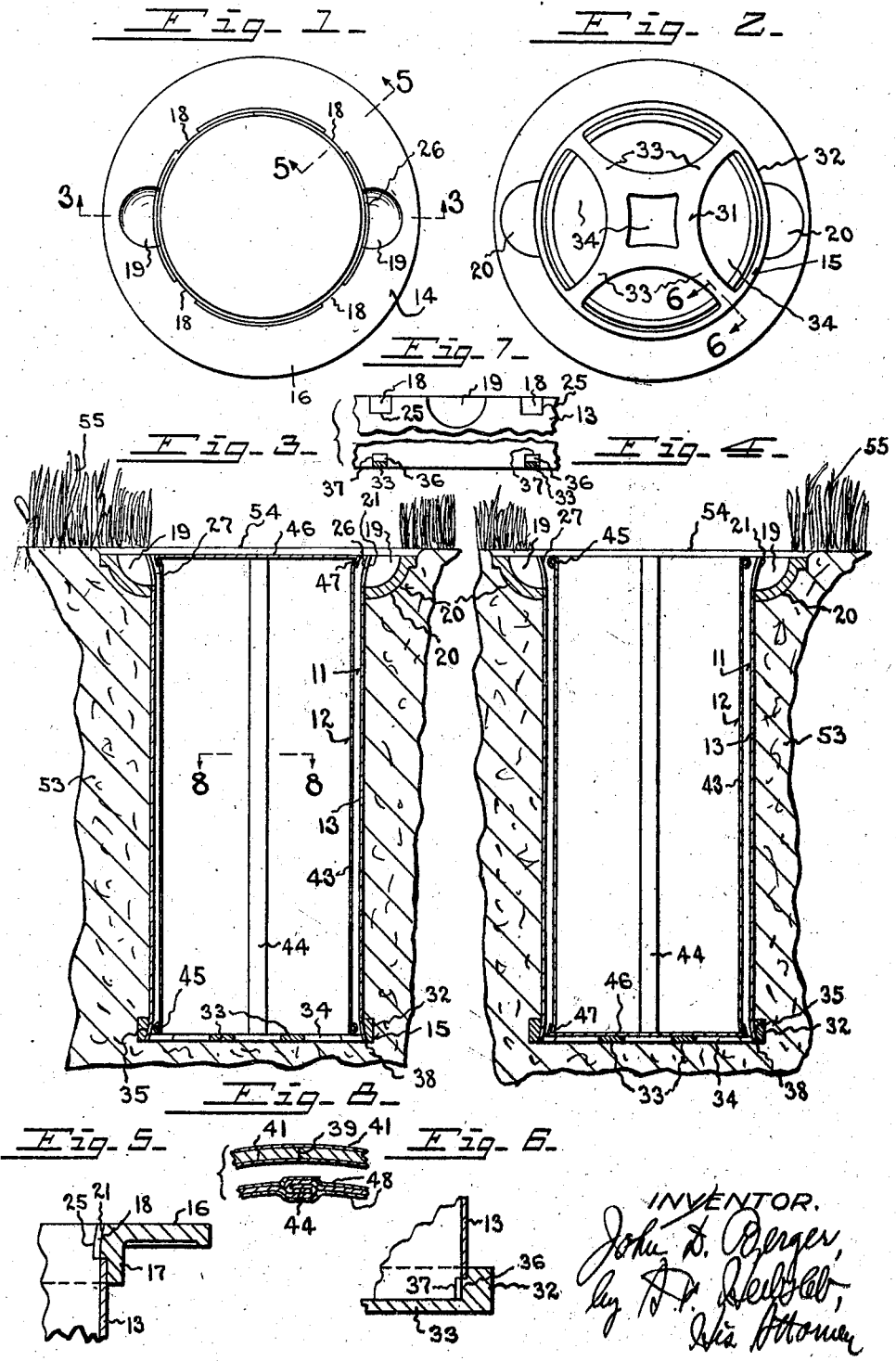

Patented Feb. 8, 1927.

1,616,647

UNITED STATES PATENT OFFICE.

JOHN D. BERGER, OF CINCINNATI, OHIO.

GROUND VASE.

Application filed June 22, 1925. Serial No. 38,721.

My invention relates to vases arranged to be sunk in the ground, for instance, on lawns, in cemeteries, or other places in which it is desired to locate cut flowers and to maintain convenient receptacles sunk into the ground in which to place the same.

It is the object of my invention to provide a ground vase of the character mentioned which may be sunk into the ground so that its top is flush with or below the surface of the ground so as to be in unobstructing relation with a lawn mower or other garden trimming tool which may be passed over the ground.

It is the object of my invention further to provide an outer receptable which is reinforced at its top in novel manner in order to maintain the shape of the opening at its top for the ready reception of an inner receptacle in which the cut flowers and the like are arranged to be received; further, to provide novel means whereby the inner receptacle may be inverted so as to close said opening in the top of the outer receptacle when the ground vase is not being used for the reception of flowers and the like; further, to so construct the wall of said opening and the ends of the inner receptacle that the inner receptacle may be readily grasped by the fingers for removal and insertion; and, further, to provide novel means whereby the raising of the outer receptacle due to frost and thawing is avoided.

The invention will be further readily understood from the following description and claims, and from the drawings, in which latter:

Fig. 1 is a plan view of my improved device, the receptacle being shown bottom up.

Fig. 2 is a bottom view of the same.

Fig. 3 is an axial section of the same, taken on the line 3—3 of Fig. 1.

Fig. 4 is a similar view, showing the inner receptacle with its open end up.

Fig. 5 is a detail shown in section on the line 5—5 of Fig. 1.

Fig. 6 is a detail shown in section on the line 6—6 of Fig. 2.

Fig. 7 is a fragmentary inside elevation of the outer receptacle; and,

Fig. 8 is a fragmentary cross-section, taken on the line 8—8 of Fig. 3.

My improved device comprises an outer casing 11 and an inner receptacle 12. The outer casing comprises a tubular wall 13, at the upper end of which there is a flange-ring 14, and at the lower end of which there is a flange-ring 15.

The flange-ring 14 is preferably a metal casting comprising a laterally extending annular flange 16 and a depending annular flange 17. The flange-ring is provided with inwardly extending lugs 18 which are spaced apart. It is also provided with recesses 19 at the opposite sides of the flange-ring, which form outward bulges 20 at the bottom of said flange-ring between the flanges thereof which strengthen the flanges. The upper end of the inner periphery of the flange-ring slopes outwardly as shown at 21 between said lugs and recesses.

The upper end of the tubular wall is provided with notches 25, in which the lugs 18 are received, and with recesses 26 which register with the recesses 19 when the flange-ring and the tubular wall are assembled. When so assembled the upper end of the tubular wall is bent outwardly, as shown at 27, upon the outwardly sloping upper end of the inner periphery of the flange-ring, with the bottoms of the notches 25 received against the bottoms of the lugs 18, so that said flange-ring and tubular wall are fixed in endwise relation, the side walls of said notches being received against the side walls of said lugs for locating said parts in annular arrangement and causing registry between the recesses 26 in said tubular wall and the recesses 19 in said flange-ring.

A spider-structure 31 at the bottom of the tubular wall comprises a flange-ring 32 between which cross-bars 33 extend, forming an integral structure, preferably a metal casting. There are spaces 34 between the cross-bars so a to provide an open bottom for the casing and supports for the inner receptacle. The lower end of the inner periphery of the flange-ring 32 slopes radially outwardly between the cross-bars, as at 35.

The flange-ring 32 is provided with inwardly extending lugs 36 at said cross-bars. The lower end of the tubular wall is provided with notches 37 which register with said lugs. The upper walls of said notches rest on the upper ends of said lugs and the side walls of said notches are positioned by the sides of said lugs.

The bottom end of the outer tubular wall is bent radially outwardly as at 38, upon the radially outwardly sloping outer end of the inner periphery of the flange-ring 32, for fixing the spider structure and the lower end of the tubular wall together, the spider structure being located axially between the upper walls of said notches and said lugs and the radially outwardly sloping lower end of the tubular wall coacting with the outwardly sloping inner periphery of the flange-ring 32.

The tubular wall 13 may be formed of heavy sheet metal bent into tubular form with the ends of the blank butted together, as indicated at 39, and electrically welded or otherwise suitably joined together.

After the formation and assembly of the parts of the casing, it is provided with a heavy metal galvanized coating 41 throughout all of its surfaces, for firmly securing all the joints and covering all parts of the casing, in order to prevent oxidation or rust.

The inner receptacle comprises a tubular wall 43, which may be formed of sheet metal into tubular form, the lapping ends thereof being seamed by a seam 44. The upper end of the tubular wall is provided with an outwardly extending bead 45. The inner receptacle is provided with a bottom 46 which is connected at the lower end of the inner tubular wall by an outwardly extending joint 47, which forms a bead at the bottom of the inner receptacle. These beads form handy gripping means for the fingers when letting the inner receptacle into the casing and removing the same therefrom.

The inner receptacle, after being formed up and assembled, is provided with a heavy galvanized coating 48 throughout all its surfaces so as to prevent oxidation and rust. It forms a vase receptacle for holding water and flowers when its open end is upward in the outer vase or container, and its bottom closes the outer casing when it is inverted.

The outer casing is sunk into the ground 53, with the upper face of the upper flange 16 flush with or preferably slightly below the surface 54 of the ground. The earth is packed about the outer periphery of the casing and is located above the lower flange 32 of the casing, which flange resists the tendency of frost and thawing to raise the receptacle out of the ground, thereby maintaining the receptacle with its upper face at the level of or below the level of the ground.

The inner receptacle is arranged to be received in the casing with either its open end up or its bottom end up. When the vase is not in use, the inner vase-receptacle is put into the casing with is bottom up, as shown in Fig. 3. This prevents foreign substances from accumulating within the casing and receptacle, and water will readily drain between the sides of the inner receptacle and the casing and through the openings 34 in the bottom of the casing.

When it is desired to use the vase for cut flowers or the like, the inner receptacle is raised or inverted with its open end upwardly, and can hold water for keeping the flowers fresh.

In either position of the inner receptacle, the top of the vase is in unobstructing relation for the unobstructed passage of a lawn mower or other trimming tool which may pass over the ground for cutting the grass or other vegetation, indicated at 55.

The inner receptacle may be readily grasped by the thumb and finger, which are readily received into the recesses 19 in the upper flange ring and through the recesses 26 in the upper end of the tubing, for grasping the bead on the inner receptacle which may be uppermost, whether that be the upper bead when the inner receptacle is in position of use in the casing, or the lower bead when the inner receptacle is in inverted position in the casing.

The outward bending of the end of the tubular wall of the casing, shown at 27, permits space for the outwardly extending beads at the respective ends of the inner receptacle.

The upper flange-ring of the casing is furthermore of substantial construction to prevent bending or crushing of the same, whereby the true form of the casing is maintained, for ready insertion and removal of the inner receptacle.

Having thus fully described my invention what I claim as new, and desire to secure by Letters Patent, is:

1. A ground vase comprising a casing including a tubular wall, a flange-ring at the upper end of said tubular wall, said flange-ring and the upper end of said tubular wall provided with inwardly opening recesses, and a flange-ring at the lower end of said tubular wall comprising a spider extending across said tubular wall, said spider provided with openings arranged for passage of water therethrough into the ground in which said ground vase is arranged to be sunk, and an inner receptacle including a tubular wall and a bottom arranged to be received in said casing in reverse positions with its respective ends supported by said spider, and the end thereof which is the upper end when so supported located in registry with said recesses.

2. A ground vase comprising a casing, including a tubular wall, an outwardly extending flange-ring at its top, the inner periphery of said flange-ring provided with inwardly extending lugs, the outer end of said inner periphery sloping radially outward, said tubular wall provided with notches in which said lugs are received and the outer end of said tubular wall between said notches bent outwardly toward said outwardly sloping outer end of said inner periphery of said flange-ring for fastening together said flange-ring and said tubular wall in both axial directions, a spider structure comprising a flange-ring and cross-bars, means securing said spider structure to the lower end of said tubular wall, and an inner receptacle received in said casing and arranged to be supported by said cross-bars.

3. A ground vase comprising a casing, including a tubular wall, an outwardly extending flange-ring at its top, a laterally outwardly extending flange-ring at its bottom, said flange-rings provided with lugs and with inner peripheries whose outer ends slope radially outward, the respective ends of said tubular wall provided with notches in which said lugs are received, and bent radially outward between said notches toward said radially outwardly sloping ends of said inner peripheries for locking said tubular wall and said flange-rings together in both endwise directions, said first-named flange-ring provided with inwardly opening recesses, the upper end of said tubular wall provided with recesses located in registry with said first-named recesses by coaction between said lugs on said first-named flange ring and said notches at the upper end of said tubular wall, and an inner receptacle arranged to be received in opposite positions in said casing and provided with laterally outwardly extending enlargements registering with said recesses when said inner receptacle is in said casing.

4. A ground vase comprising a casing, including a tubular wall, an outwardly extending flange-ring at its top, a laterally outwardly extending flange-ring at its bottom, each of said flange-rings provided with lugs, each end of said tubular wall provided with notches in which said lugs are received, and the respective ends of said tubular wall bent radially outwardly for joining the same to said flange-rings, said first-named flange-ring provided with inwardly opening recesses, the upper end of said tubular wall provided with recesses located in registry with said first-named recesses by coaction between said lugs on said first-named flange-ring and said notches at the upper end of said tubular wall, and a moisture-resistant coating covering said assembled parts and joints.

5. A ground vase comprising a casing including a tubular wall, an outwardly extending flange-ring at its top, a spider-structure comprising a laterally outwardly extending flange-ring and cross-bars, each of said flange-rings provided with lugs, each end of said tubular wall provided with notches in which said lugs are received, said first-named flange-ring provided with inwardly opening recesses, the upper end of said tubular wall provided with recesses located in registry with said first-named recesses by coaction between said lugs on said first-named flange-ring and said notches at the upper end of said tubular wall, and an inner receptacle arranged to be received in opposite positions in said casing and provided with laterally outwardly extending enlargements registering with said recesses when said inner receptacle is in said casing, said casing and its assembled parts and said inner receptacle and its parts each provided with a moisture-resistant coating after assembly.

In testimony whereof, I have hereunto signed my name.

JOHN D. BERGER.